(12) United States Patent
Lubbers et al.

(10) Patent No.: US 7,620,887 B1
(45) Date of Patent: Nov. 17, 2009

(54) SYSTEM AND METHOD OF EVALUATING THE INTEGRITY OF A SET OF FILES

(75) Inventors: Jedidja Lubbers, Foster City, CA (US); Tobias Olney, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 577 days.

(21) Appl. No.: 10/121,354

(22) Filed: Apr. 12, 2002

(51) Int. Cl.
*G06F 17/00* (2006.01)
(52) U.S. Cl. ............... 715/205; 715/206; 715/207; 715/208; 715/234
(58) Field of Classification Search ......... 715/513, 715/501.1, 205–208, 234
See application file for complete search history.

(56) References Cited

U.S. PATENT DOCUMENTS

| | | | | |
|---|---|---|---|---|
| 5,995,099 A | * | 11/1999 | Horstmann | 715/501.1 |
| 6,094,665 A | * | 7/2000 | Lyons et al. | 715/531 |
| 6,286,006 B1 | * | 9/2001 | Bharat et al. | 707/100 |
| 2004/0024848 A1 | * | 2/2004 | Smith et al. | 709/219 |
| 2004/0049598 A1 | * | 3/2004 | Tucker et al. | 709/246 |
| 2004/0091042 A1 | * | 5/2004 | Herath | 375/240 |
| 2006/0206536 A1 | * | 9/2006 | Sawdon et al. | 707/200 |

OTHER PUBLICATIONS

Davis, Hugh C. "Hypertext Link Integrity", Dec. 1999, ACM Computing Surveys 31(4). Available: http://www.cs.brown.edu/memex/ACM_HypertextTestbed/papers/54.html.*

* cited by examiner

*Primary Examiner*—Rachna S Desai
(74) *Attorney, Agent, or Firm*—Park, Vaughan & Fleming LLP

(57) ABSTRACT

A system and method for evaluating the integrity of a set of electronically stored files that contain hypertext links or other types of file references. The set of files may be received in compressed or uncompressed form. An integrity evaluator evaluates each file in the set of files for one or more integrity conditions or violations. The integrity evaluator may determine whether any of the files include no references to other files, or are not referenced by any other files. The integrity evaluator may also test for broken references, references employing absolute path names, invalid symbols within references, and other conditions. A report module issues a report regarding the integrity of the files and their references.

9 Claims, 7 Drawing Sheets

SYSTEM AND METHOD OF EVALUATING THE INTEGRITY OF A SET OF FILES

BACKGROUND

This invention relates generally to the field of computer systems. More particularly, a system and methods are provided for evaluating the integrity of a set of electronically stored files that contain hypertext links.

Traditionally, documentation for software and other computer-related products has been produced and distributed in a hard-copy form, such as books and manuals. However, more and more documentation and product help systems are being delivered in electronic form. As a result of the popularity of the Internet, and the widespread availability of software tools such as browsers that allow a person to read and navigate electronically stored hypertext link based file sets, HTML (HyperText Markup Language) has emerged as one of the de-facto standards for delivering electronic information.

HTML, as well as other types of standard generalized markup languages such as XML (Extensible Markup Language), provides a hardware-independent and operating system-independent scheme for defining the various components and cross-references found in a set of electronically stored hypertext link files—such as those that comprise a software help system or a World Wide Web site.

One of the chief benefits of a markup language such as HTML lies in its ability to link text and/or an image—in a document file currently being viewed—to the content of another document file, or to content found within the current document file. Many computer users are familiar with browser software that highlights the link text or image with color and/or an underline to indicate a hypertext link (often shortened to "hyperlink" or just "link").

The amount of information available in electronically stored hypertext link file systems has grown enormously. Help systems and World Wide Web pages can encompass thousands of individual files, and each individual file may contain hundreds of links.

A large hypertext system, or set of web pages, often contains problems that detract from one's use or enjoyment of the system. Such problems include broken links, extra files and missing files. Linkage errors that prevent hypertext systems from being portable across different types of computer platforms and systems also arise. Linkage errors include errors in the format or syntax of a hypertext link. In addition, when the content of a help system or Web page is translated from one language to another, existing problems are propagated and additional hypertext link errors are often introduced.

Efforts by hypertext system authors to eliminate errors in hypertext systems before they are published have usually involved manually verifying the integrity of the hypertext links in the systems. This method of verification can be very time consuming and prone to error in all but the smallest of hypertext systems.

Software tools for performing hypertext system integrity checks often fail to operate properly on larger hypertext systems, therefore requiring the user to break a large set of hypertext-linked files into multiple smaller sets so that the tool can check the system. An unfortunate side effect of breaking up the set of files is that hypertext links in the divided file sets often become invalid as a result of the limitations of the tool used to verify the system. Also, current tools fail to provide comprehensive checks for all types of linkage errors.

Further, the available tools are limited in that they are unable to run validity checks of hypertext-linked file sets formatted in some types of protocols used in Help systems, such as Java Help and Oracle® Help for Java. And, the tools frequently fail to identify problems in hypertext file systems that prevent one hypertext system from being utilized on different computing platforms or operating systems. Also, existing tools are unable to analyze compressed files (e.g., files stored in a .JAR or .ZIP file). Such files must be manually decompressed before a tool can analyze them.

Still further, many of the user interfaces provided with the tools require time and labor intensive interactive operation, and provide no means of automating the verification process.

The analysis and reporting capabilities of current hypertext link verification checking tools are generally limited to the production of simple text files that list broken links. This type of reporting provides little assistance to the system author in identifying and repairing incorrect or invalid hypertext links in the system, and is often cumbersome to use.

Thus, there is a need in the art for a comprehensive, automated method of evaluating a set of files containing hypertext links to ensure that they are published without linkage errors. Such a method will allow virtually any type of hypertext-linked or markup language based file sets to be evaluated. A need also exists for a method of evaluation that will help ensure that hypertext-linked file systems are portable across hardware and operating system platforms without modification.

SUMMARY

In one embodiment of the invention a system and methods are provided for evaluating the integrity of a set of files containing any number of hypertext links. The evaluation of the set of files may be performed by an integrity evaluator and guided by one or more analysis parameters.

Each of the electronically stored files in the set of files is examined to determine which of the files, if any, contains one or more references to any other file(s) in the set of files, and to further determine which files, if any, are not referred to by any other file in the set of files. Also, the references in each file are examined to determine which of the references, if any, violate one or more integrity conditions.

In one embodiment of the invention, an integrity evaluator attempts to identify references that do not refer to any file in the set of files, references that contain invalid symbols, and/or references that contain an absolute path and file name.

The evaluation may further comprise the production of an integrity analysis. An integrity analysis may include a summary of the evaluation and, optionally, detailed findings regarding each type of integrity error.

DETAILED DESCRIPTION

Figure 1:
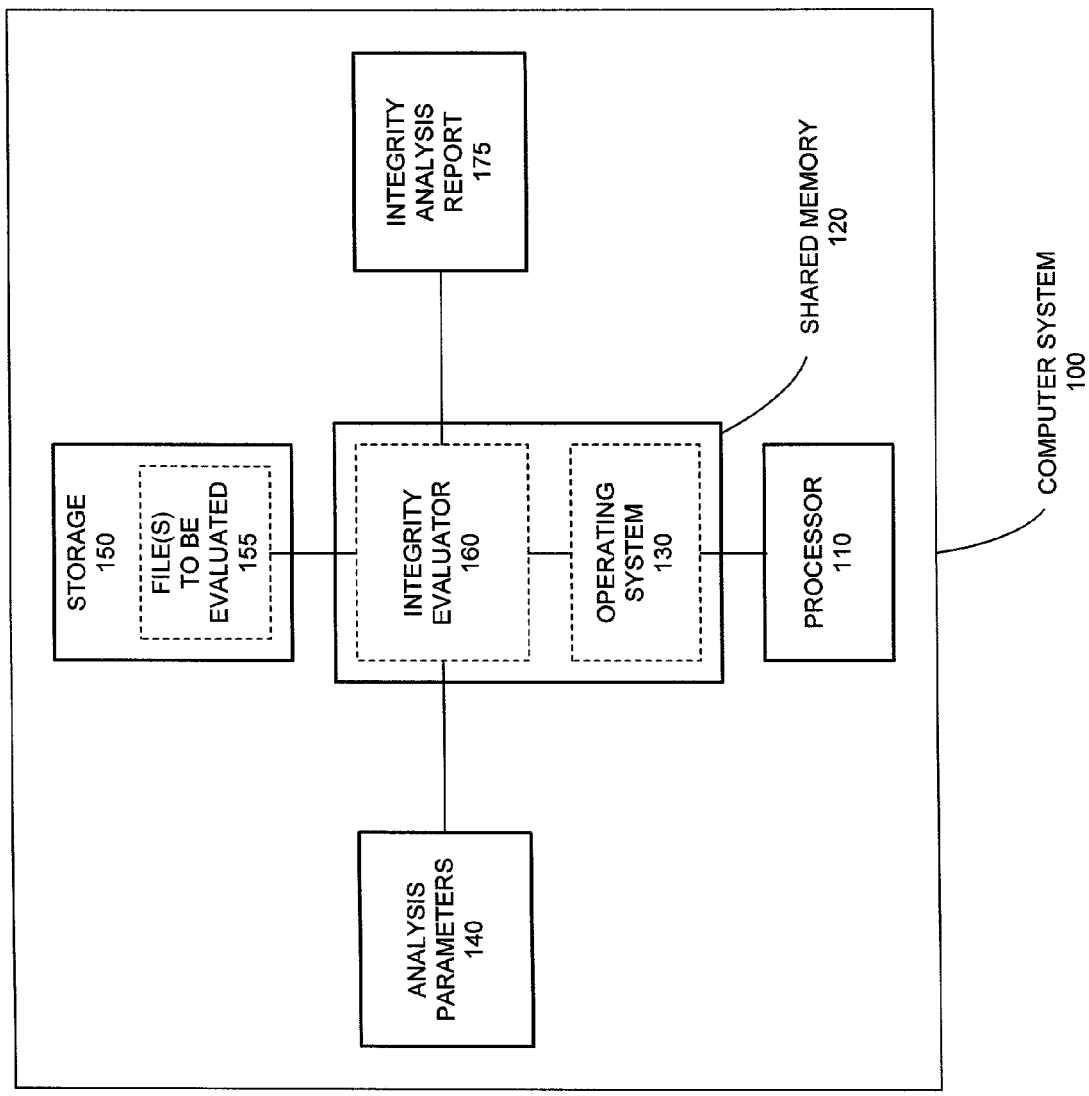
FIG. 1 depicts a computer system in which the integrity of a set of files may be evaluated, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable storage media may include volatile (e.g., RAM) and/or non-volatile (e.g., ROM, disk) memory.

In embodiments of the invention described herein, systems and methods are provided for evaluating the integrity of a set of electronically stored files.

In one embodiment of the current invention, an integrity evaluator is provided for evaluating the integrity of the files. Illustratively, a computer system configured to execute the integrity evaluator comprises a processor, an operating system, a shared memory, a computer readable storage medium and a set of analysis parameters. The operating system and the integrity evaluator reside within shared memory, and are executed by the processor. The operating system manages the computer system resources (e.g., processor, shared memory, and computer readable storage medium) at a low level and provides input/output services to the integrity evaluator. The set of files are stored on the computer readable storage medium, possibly in a compressed format (e.g., in a .JAR or .ZIP file), and are formatted according to the Hypertext Markup Language (HTML).

In this embodiment of the invention, the analysis parameters identify the location of the set of files that are to be evaluated by the integrity evaluator, as well as the first file that is to be examined. The analysis parameters also identify the operating system platform that is managing the computer system.

The integrity evaluator receives the analysis parameters, and begins evaluating the first file in the set of files that is specified by the analysis parameters. In this embodiment, the integrity evaluator operates by examining each file in the set of files, as well as each of the hypertext links found within the files contained in the set of files. The integrity evaluator collects analysis data on the hypertext links and the files in the set of files as part of its examination process.

In this embodiment of the invention, the integrity evaluator examines files and links, and collects analysis data on, any or all of the following: broken links, invalid paths within broken links, links to files not present in the set of files, files that do not contain any links, files that are not linked to any other file in the set of files (orphaned files), links that contain invalid symbols, links that contain invalid backward slashes ("\") and links that contain characters of incorrect case. In other embodiments of the invention, an integrity evaluator may target any subset of these errors or problems, and/or others not delineated here.

The integrity evaluator may be configured to prepare an HTML integrity analysis report regarding the results of its evaluation. For example, in one embodiment of the invention, the data collected by the integrity evaluator are used to form specific reports or statistics for each type of integrity condition violated by a link and/or file that the evaluator has identified, and an overall summary.

FIG. 1 depicts a computer system for operating an integrity evaluator, according to one embodiment of the invention. In computer system 100, integrity evaluator 160 and operating system 130 are resident in shared memory 120, and are executed by processor 110. Operating system 130 manages the resources (e.g., shared memory 120, processor 110, storage 150) of computer system 100 at a low level, and provides input/output services for integrity evaluator 160. Files 155 comprise one or more electronically stored files to be evaluated by integrity evaluator 160. Storage 150 is a computer readable electronic storage area for files 155. Analysis parameters 140 include parameters or data for initializing and/or guiding the operation of integrity evaluator 160. Integrity analysis report 175 is an accounting of the evaluation performed by integrity evaluator 160.

In one embodiment of the invention, integrity evaluator 160 receives analysis parameters 140. Illustratively, analysis parameters 140 include initialization arguments that specify the location of files 155 within storage 150, the name of the first file, in files 155, to be evaluated by integrity evaluator 160, and/or other operating parameters.

Computer system 100 of FIG. 1 may also include one or more ports or interfaces for interacting with other computing or communication devices. In particular, computer 100 may be coupled to a wired or wireless communication link for receiving and/or forwarding files 155, analysis parameters 140, integrity analysis report 175 and/or other information.

Figure 2:
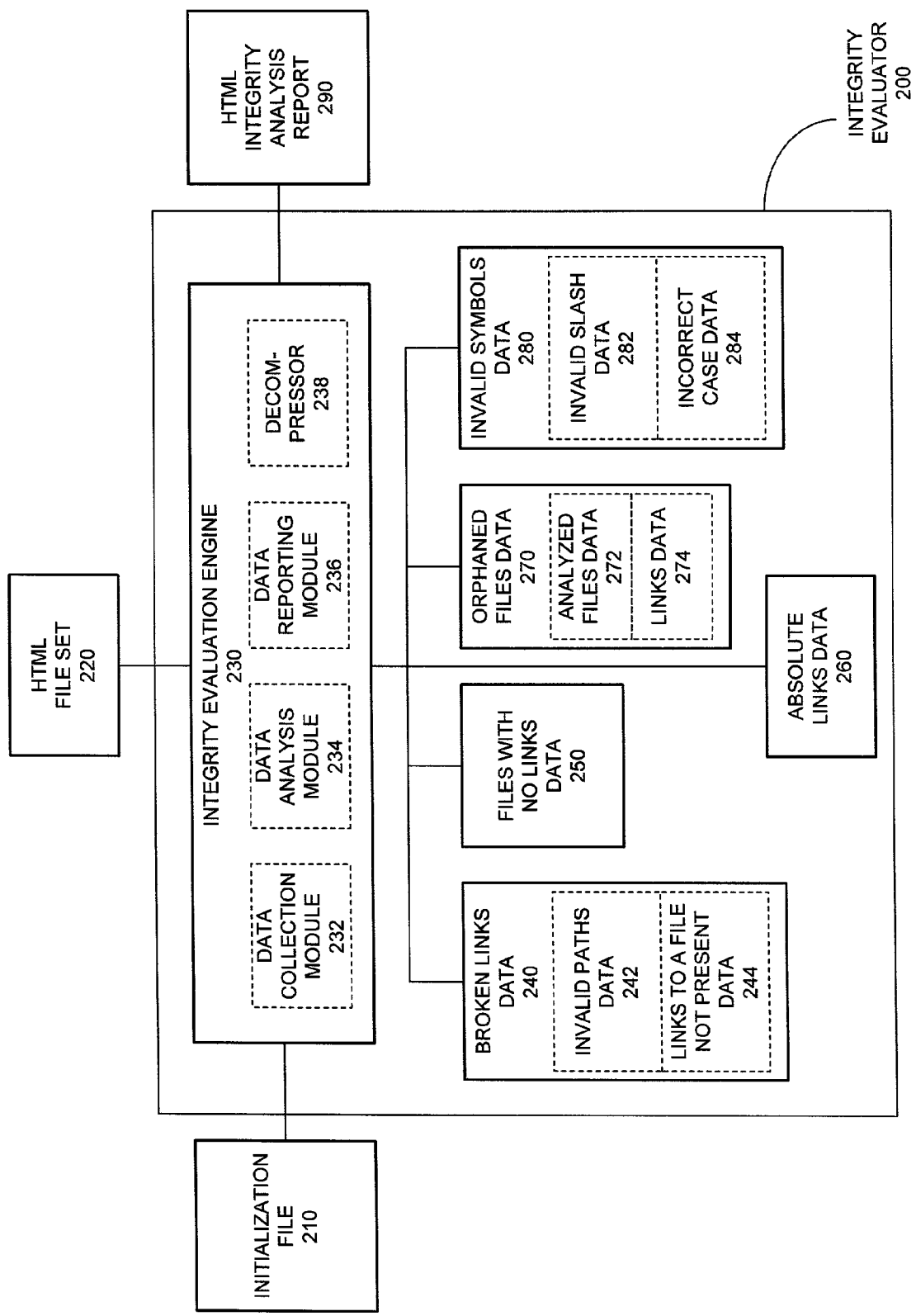
FIG. 2 depicts an integrity evaluator, in accordance with an embodiment of the invention.

FIG. 2 depicts an integrity evaluator, in accordance with an embodiment of the invention. In integrity evaluator 200, integrity evaluation engine 230 receives initialization file 210, evaluates the integrity of HTML file set 220, and produces HTML integrity analysis report 290.

In integrity evaluation engine 230, data collection module 232 gathers file and reference link data from HTML file set 220. Data analysis module 234 examines the data collected by data collection module 232, and maintains analysis data and statistics on each file and/or reference link in HTML file set 220 that violate one or more integrity conditions. Data reporting module 236 uses the analysis data developed by data analysis module 234 to produce HTML integrity analysis report 290. Decompressor 238 decompresses compressed files for analysis, as necessary. In different embodiments of the invention, a compressed file or set of files (e.g., in a .JAR or .ZIP file) may be decompressed before or during an integrity evaluation session. Alternatively, a file may be analyzed in compressed form.

In the illustrated embodiment of the invention, a different set of data may be maintained for each category of integrity conditions that the integrity evaluator searches for. Thus, in FIG. 2, data analysis module 234 maintains the following data collections: broken links data 240, files with no links data 250, absolute links data 260, orphaned files data 270, and invalid symbols data 280. Each collection of data may correspond to a different type or mode of analysis and/or a different report that may be produced. Any data collection may overlap another, and any or all of the data collections may be merged or further divided.

Broken links data 240 is further sub-categorized into invalid paths data 242, and links to a file not present data 244. Similarly, invalid symbols data 280 is further sub-categorized into invalid slash data 282 and incorrect case data 284.

Files with no links data 250 identifies those files that contain no links or references. Absolute links data 260 includes links that reference a file via an absolute path or file name.

Orphaned files data 270 includes analyzed files data 272 and links data 274. Analyzed files data 272 identifies (e.g., by file name) each file that is analyzed, while links data 274 identifies links within an analyzed file. A link may be identified by the name of the file referenced by the link.

In an embodiment of the invention, the analysis data maintained for each category and sub-category above by data analysis module 234 may include a count of the number of files and/or references that are identified for each category or type of integrity condition monitored by the integrity evaluator. For any or all of the integrity condition categories identified above, data analysis module 234 may also maintain the name and location of each file in HTML file set 220 that violated an integrity condition.

In addition, for broken links data 240, invalid paths data 242, links to a file not present data 244, absolute links data 260, invalid symbols data 280, invalid slash data 282, and incorrect case data 284, data analysis module 234 may store the full identity of the reference that contains the violated integrity condition, and/or the line number within the file where the reference is located.

Figure 3:
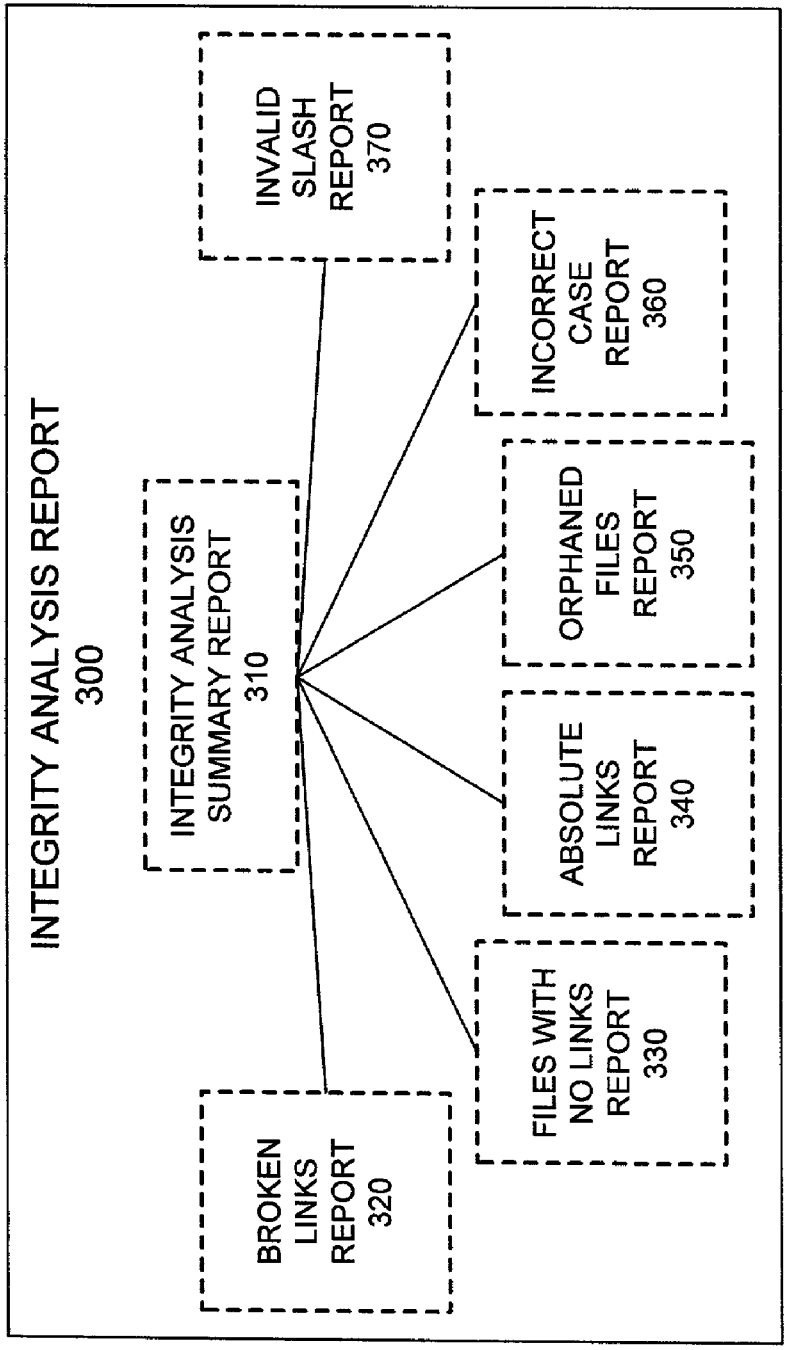
FIG. 3 is a block diagram illustrating an integrity analysis report, in accordance with an embodiment of the invention.
Figure 4A:
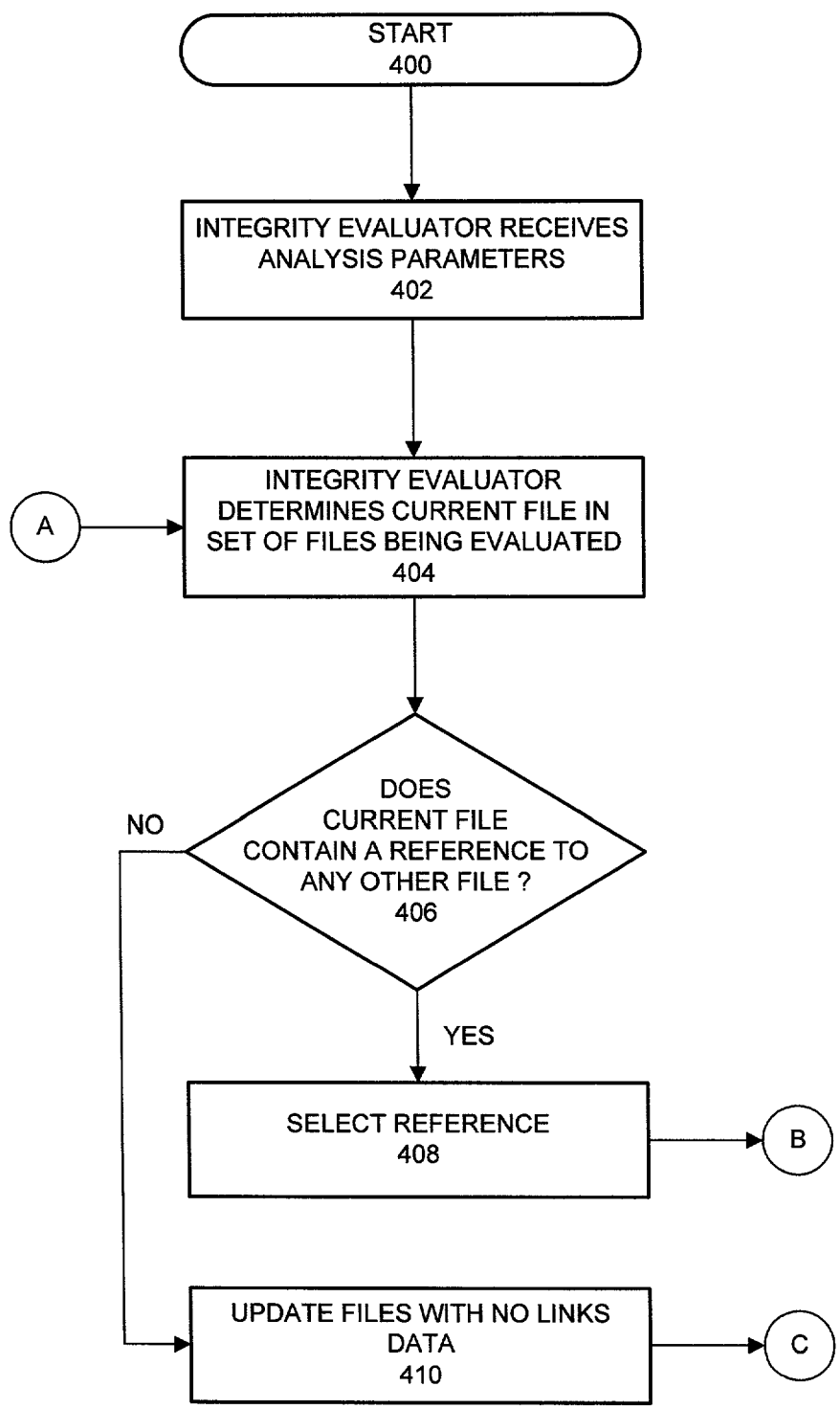
FIGS. 4A-4E comprise a flowchart illustrating one method of evaluating the integrity of a set of files, in accordance with an embodiment of the invention.
Figure 4B:
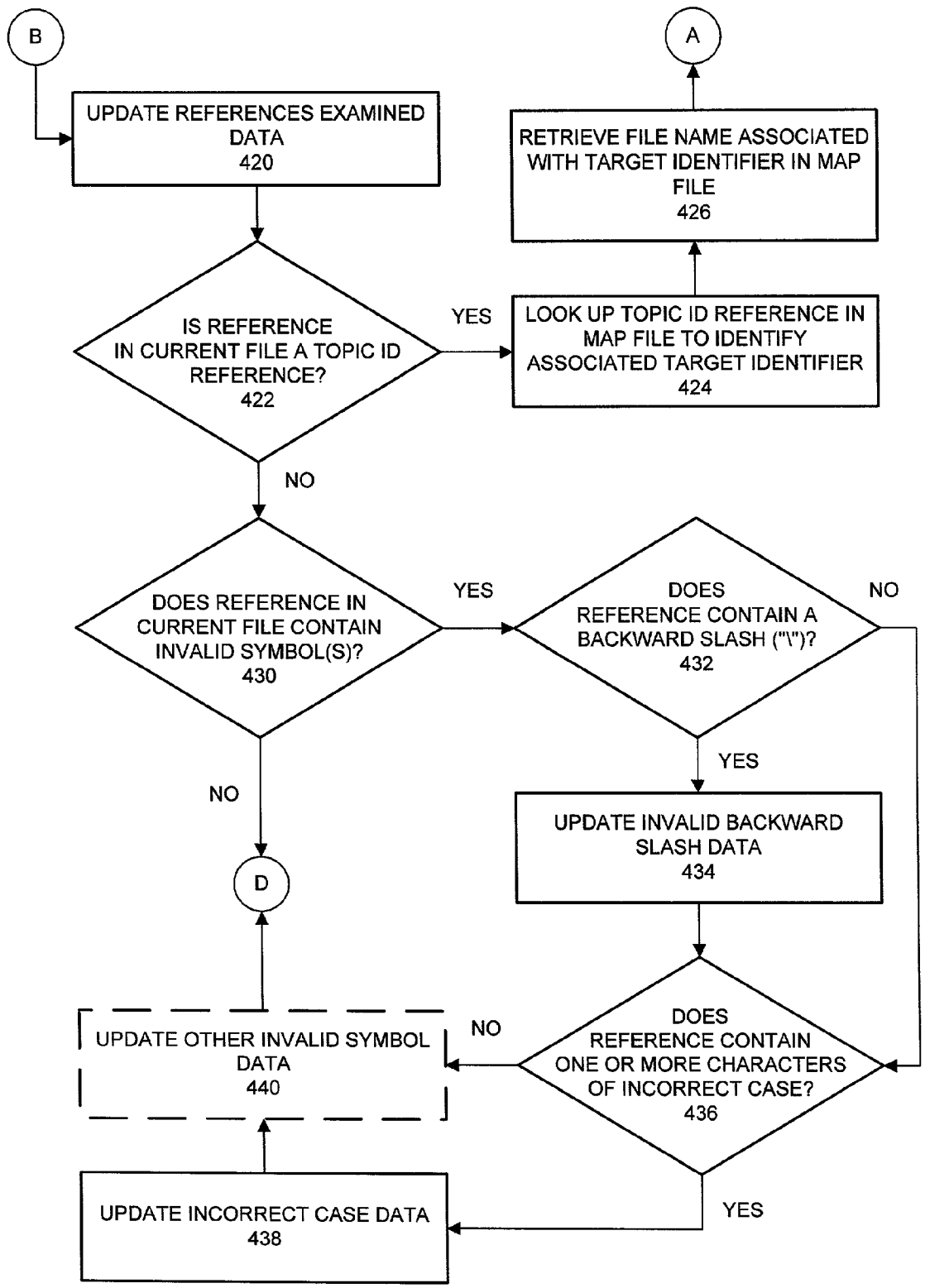
Figure 4C:
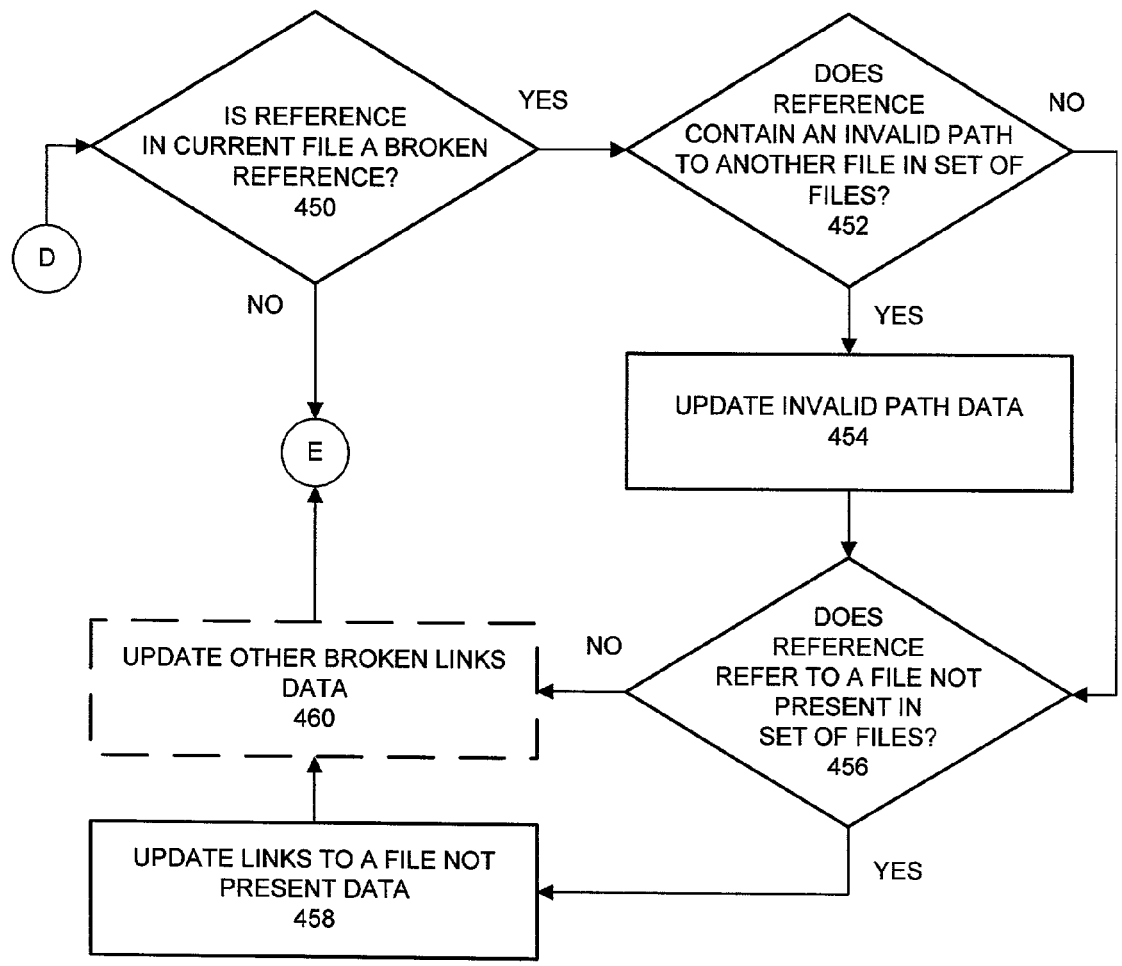
Figure 4D:
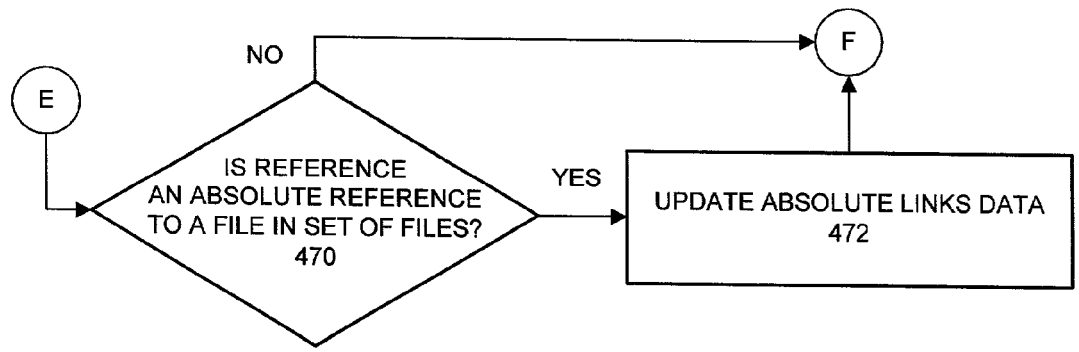
Figure 4E:
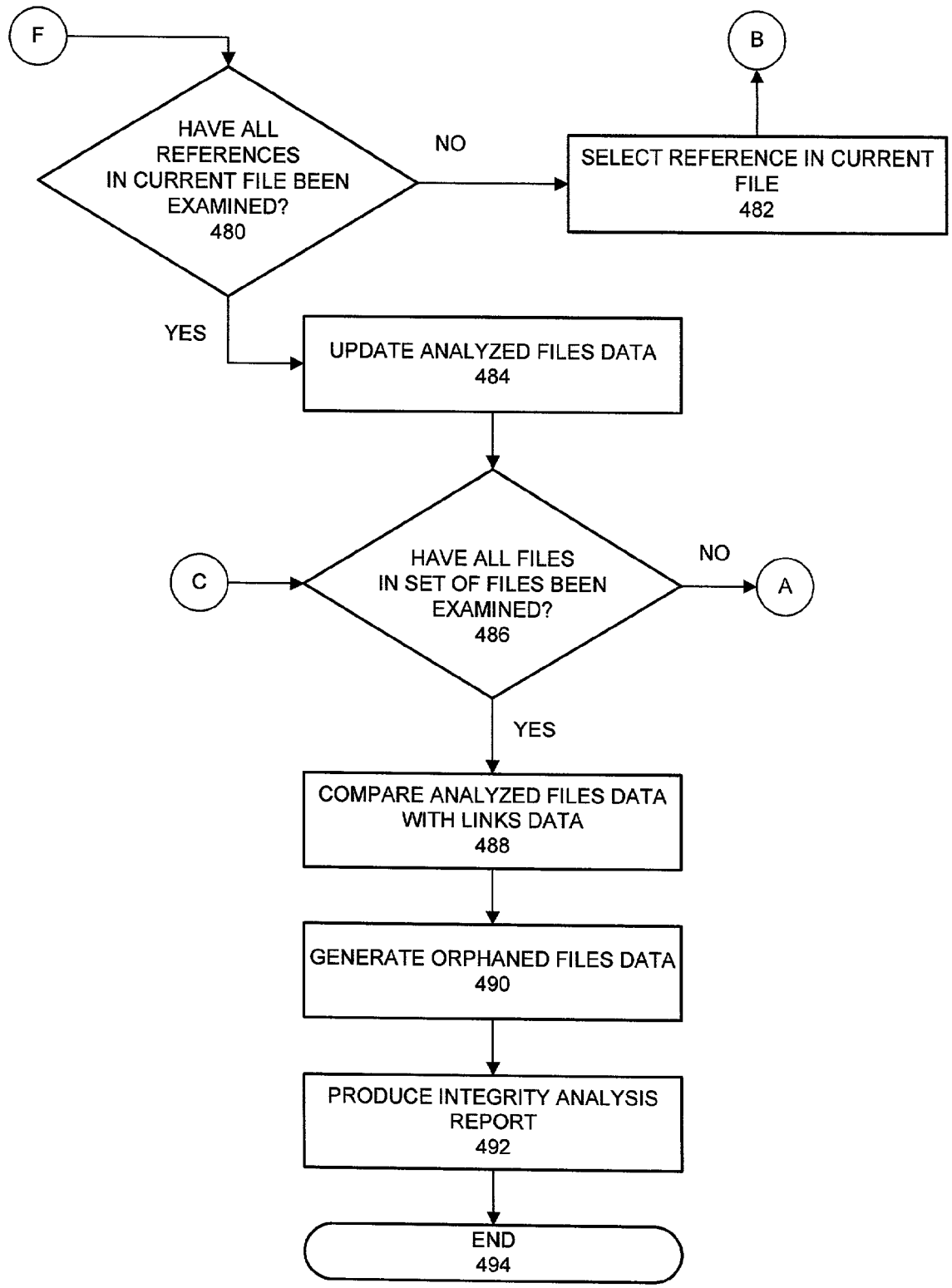

FIG. 3 is a block diagram illustrating an integrity analysis report, in accordance with an embodiment of the invention. In this embodiment of the invention, integrity analysis report 300 reports the analysis results of an evaluation of the integrity of a set of electronically stored files.

Integrity analysis report 300 comprises integrity analysis summary report 310. Summary report 310 summarizes information from detailed reports regarding each of the different categories of integrity condition that an integrity evaluator may employ. Thus, in this embodiment of the invention, summary report 310 summarizes the following detailed reports: broken links report 320, files with no links report 330, absolute links report 340, orphaned files report 350, orphaned files report 350, incorrect case report 360, and invalid slash report 370.

In this embodiment of the invention, integrity analysis summary report 310 reports general information such as the date and time that the integrity evaluation was performed on the set of files, the location of the files that were examined, the total number of individual files in the set of files that were examined, etc.

In addition, integrity analysis summary report 310 summarizes the total number of violated integrity conditions within each of the detailed reports for the various categories of integrity conditions.

Because integrity analysis summary report 310 and/or the violated detailed reports noted above may comprise HTML reports, any of them may include links to more detailed information.

In this embodiment of the invention, the violated integrity condition detail reports 320, 330, 340, 350, 360, and 370 may contain information concerning the names and locations of the references (links) and/or files that violated an integrity condition in the examined files.

For the files that are not referenced by any other file in the file set (e.g., orphaned files), and for files that contained no links, fully qualified path names to the files may be provided in detail reports 330, 350.

For the files that contained broken links, absolute links, references with invalid backward slashes and references containing characters of incorrect case, fully qualified path names to the files may be provided in detail reports 320, 340, 360, 370 as appropriate. Further, references (links) and their corresponding line numbers within the files containing the references with violated integrity conditions may be reported in detail reports 320, 330, 340, 350, 360, 370 for any of the categories in which integrity condition violations have been identified.

FIGS. 4A-4E comprise a flowchart illustrating one method of evaluating the integrity of a set of files, in accordance with an embodiment of the invention.

State 400 is a start state. In state 402, an integrity evaluator receives analysis parameters. Analysis parameters may be provided in the form of a textual initialization file. Illustratively, the analysis parameters include a pathname to the file set where the integrity evaluator will begin examination of the files to be evaluated, as well as an identification of the type of computer operating system platform that the integrity evaluator is operating on. In the embodiment of FIGS. 4A-4E, the integrity evaluator executes in a Solaris® or Microsoft NT operating system environment.

As one skilled in the art will recognize, analysis parameters in another embodiment of the current invention may contain a different set of analysis parameters. For example, an initialization file may contain, but is not limited to, multiple initialization strings, reporting option instructions, file filter options, integrity test options, numeric constants, flags, file locations or switches to limit, extend, expand, initialize, direct or otherwise control the operation of the integrity evaluator. Further, one skilled in the art will recognize that, in another embodiment of the invention, analysis parameters may be delivered to the integrity evaluator via an interactive interface controlled by a user, rather than via a text based initialization file.

In state 404, the integrity evaluator determines or selects an individual file in the set of files to be evaluated to become the "current" file for examination. At all times while it is operating, the integrity evaluator keeps a record of which file in the set of files being examined is the "current" file. The current file can change many times while the integrity evaluator is operating, and multiple files may be open simultaneously; however, at any given moment, only one individual file in the set of files to be examined will be the "current" file. Alternatively, just a single file may be open at a time—in which case the open file will always be the current file.

In state 406, the integrity evaluator determines whether the current file contains at least one (unexamined) reference to any other file. If the current file contains at least one reference to another file, the integrity evaluator selects a reference in state 408, then proceeds to state 420, where the examination of the reference continues.

If, however, the current file contains no references to any other file, the integrity evaluator proceeds to state 410. In state 410, the integrity evaluator updates the files with no links data that is being collected. Because the current file does not contain any links or references to any other file, the examination of this file is complete. The integrity evaluator therefore proceeds to state 486 from state 410.

In state 420, the integrity evaluator updates the references examined data (or links data) that is being collected. As described above, identities or descriptions of every link or reference that is analyzed is saved.

In state 422, the integrity evaluator determines if the reference being examined in the current file is a topic id reference (e.g., a label). If the reference being examined is not a topic id reference, the integrity evaluator advances to state 430. If, however, the reference is a topic id reference, the evaluator continues at state 424.

In state 424, the integrity evaluator searches for the topic id reference in a mapping file. In the illustrated embodiment of the invention, the mapping file is included in the set of files to be evaluated, and is available for use by the integrity evaluator. The mapping file in this embodiment is a listing of target identifiers that cross-reference topic id references to file names and paths of files in the set of files to be examined.

The evaluator then proceeds to state 426, where the file path and file name of another file in the set of files is retrieved from the target identifier in the mapping file. After state 426, the integrity evaluator returns to state 404, where the current file is changed to be the file retrieved from the mapping file in state 426. Evaluation of the new current file then begins with state 406, as detailed above.

In an alternative embodiment of the invention, the integrity evaluator may just check the validity of the mapping between the topic id reference and the associated file, and then return to the present current file. Thus, in this alternative embodiment, the integrity evaluator postpones a full analysis of the associated file (i.e., any links in the associated file) until later, instead of making the associated file the current file and analyzing it now.

In state 430, the integrity evaluator determines if the reference being examined in the current file contains an invalid symbol. If the reference does not contain an invalid symbol, the evaluator proceeds to state 450. Otherwise, the integrity evaluator continues at state 432.

In one embodiment of the invention, the integrity evaluator collects analysis data on all types of invalid symbols, including backward slashes and characters of invalid case. As one skilled in the art will recognize, the determination of which symbols constitute invalid symbols is largely dependent upon the operating system platform upon which a particular embodiment of the integrity evaluator is implemented, and/or other restrictions regarding files to be published. For purposes of illustration, the illustrated method of the invention is shown collecting analysis data on two specific instances of invalid symbols within a reference (i.e., backward slash, and one or more characters of incorrect case). In other embodiments of the invention, other symbols may be considered invalid.

Files are examined for these two specific types of invalid symbols because they are common causes of platform portability problems when hypertext-linked file systems (e.g., help systems and World Wide Web pages) are implemented on the file management systems of multiple operating systems. In particular, the backward slash character is not permitted in path and file names in UNIX based file systems. Further, UNIX based file systems are case sensitive. If the case of one or more of the characters found within the reference being examined by the integrity evaluator does not exactly match the case of the file path and/or name which the reference refers to on a character-by-character basis, the characters of incorrect case are considered to be invalid symbols by the integrity evaluator.

In state 432, the integrity evaluator determines if the reference being examined contains a backward slash character ("\"). If the reference being examined does not contain a backward slash character, the evaluator proceeds to state 436. If the reference being examined contains an invalid symbol, the integrity evaluator proceeds to state 434.

In state 434, the evaluator updates the invalid slash data that it is collecting.

In state 436, the integrity evaluator determines if the reference being examined contains one or more characters of incorrect case. If the reference being examined does not contain any characters of incorrect case, the evaluator proceeds to state 440. If the reference being examined contains one or more characters of incorrect case, the integrity evaluator proceeds to state 438.

In state 438, the evaluator updates the incorrect case data that it is collecting.

In optional state 40, the evaluator updates any other invalid symbol data that it is collecting (e.g., for invalid symbols other than backward slashes and characters of incorrect case). From state 440, the integrity evaluator proceeds to state 450.

In state 450, the integrity evaluator determines if the reference being examined in the current file is a broken reference. If the reference being examined is not a broken reference, the evaluator proceeds to state 470. If the reference being examined is a broken reference, the integrity evaluator proceeds to state 452.

In the illustrated method of the invention, the evaluator collects analysis data on various types of broken references, including references that contain invalid path data and references that contain a reference to a file not present in the set of files being evaluated. As one skilled in the art will recognize, the factors that contribute to a reference being considered a "broken" reference can be largely dependent upon the operating environment in which a particular embodiment of the integrity evaluator is implemented.

For example, in one alternative embodiment of the invention, a broken reference may comprise a reference to the file name of the file that the reference is currently contained in. In another alternative embodiment of the invention, a broken reference may comprise a reference containing a valid path name and a valid name of a file contained in the set of files to be evaluated, but the file may not have the proper file use permissions granted by the operating system that is in use on the system where the integrity evaluator is operating.

In state 452, the integrity evaluator determines if the broken reference being examined contains an invalid path to another file in the set of files being evaluated. If the broken reference being examined does not contain an invalid path to another file in the set of files being evaluated, the evaluator proceeds to state 456. If the broken reference being examined contains an invalid path to another file in the set of files being evaluated, the integrity evaluator proceeds to state 454.

In state 454, the integrity evaluator updates the invalid path data that it is collecting.

In state 456, the integrity evaluator determines if the broken reference being examined contains a reference to a file not present in the set of files to be evaluated. If the broken reference being examined contains a reference to a file not present in the set of files to be evaluated, the integrity evaluator proceeds to state 458. Otherwise, the illustrated method advances to state 460.

In state 458, the evaluator updates the links to a file not present data that it is collecting.

In optional state 460, the evaluator updates other broken links data that it is collecting (e.g., for broken links other than those caused by invalid path references to another file within the set of files to be evaluated and references to files not present in the set of files to be evaluated). From state 460, the integrity evaluator proceeds to state 470.

In state 470, the integrity evaluator determines if the reference being examined is an absolute reference. If the reference being examined is not an absolute reference, the evaluator proceeds to state 480. If the reference being examined is an absolute reference, the integrity evaluator proceeds to state 472.

In the illustrated embodiment of the invention, an absolute reference (or link) is a reference that contains a fully qualified pathname from the top-most root node, file or directory in a hierarchical file system to the referenced (i.e., linked) file.

As one skilled in the art will recognize, the exact syntax of an absolute reference may vary depending on the operating system and/or file system in use by the computer system on which the integrity evaluator is operating. In addition, one skilled in the art will recognize that absolute links do not necessarily constitute an error within a hypertext-linked file system. However, absolute links can make a hypertext-linked file system such as a help system or a World Wide Web page more difficult to migrate from one computing system to another, or to move from one location in a file system to another location in the same file system, since the movement of the hypertext-linked system may cause the absolute links in the hypertext-linked system to become broken links.

In state 472, the evaluator updates the absolute links analysis data that it is collecting. From state 472, the integrity evaluator proceeds to state 480.

In state 480, the integrity evaluator determines if all references in the current file have been examined. If all references in the current file have been evaluated, the integrity evaluator proceeds to state 484.

If one or more references in the current file have not been evaluated, then in state 482 the integrity evaluator selects another reference in the current file and returns to state 420, where the evaluation process continues as described above.

In state 484, the integrity evaluator updates its analyzed files data. As described previously, the names of all analyzed files are collected to facilitate production of orphaned files data.

In state 486, the integrity evaluator determines if all of the files in the set of files have been thoroughly examined. If any file has not been completely examined, the integrity evaluator returns to state 404 to determine which file in the set of files will become the new current file. The examination of the new current file then continues, as detailed above. If all of the files in the set of files have been completely examined, the integrity evaluator proceeds to state 488.

In this embodiment of the invention, the integrity evaluator examines every reference (link) in every file in the set of files to be evaluated. They may be examined sequentially. The integrity evaluator maintains information, internally, that allows it to know, at any given time, which files in the set of files have had their references completely examined, partially examined or not examined.

In state 488, the integrity evaluator cross-checks the collected analyzed files data with the references examined data, to determine if any of the files in the set of files are orphaned. In particular, the integrity evaluator determines whether every file in the set of files being evaluated is referenced by at least one other file in the set of files.

In state 490, the integrity evaluator generates orphaned files data to identify the files that are orphans. If no orphaned files were identified in state 488, then state 490 may be skipped or bypassed.

In state 492, the integrity evaluator has completed its data collection. Therefore, in the present embodiment of the invention, the integrity evaluator analyzes the data collected and produces a multi-tiered integrity analysis report.

In this embodiment of the invention, and as described above in conjunction with FIG. 3, the integrity evaluator produces an integrity analysis summary and a detailed integrity analysis, either or both of which may be formatted according to the Hypertext Markup Language (HTML).

From state 492, the integrity evaluator proceeds to state 494, which is an end state.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of analyzing the integrity of a set of electronically stored files, comprising:

receiving, on a computer, a set of analysis parameters, the analysis parameters including parameters for initializing and guiding the evaluation and parameters specifying integrity test options;

receiving, on the computer, a mapping file which includes at least one topic id reference associated with a file name and a file path;

identifying, on the computer, a current file in said set of electronically stored files;

evaluating, on the computer, a current file using the received analysis parameters;

said evaluating comprising:

determining, on the computer, whether said current file contains an invalid symbol within a reference to a second file in said set of electronically stored files;

determining, on the computer, whether said current file contains a broken reference;

determining, on the computer, whether said current file contains an absolute reference;

determining, on the computer, whether said current file is not referenced by a link within another file, when said current file is not referenced by a link within another file, it is an orphan file;

determining, on the computer, whether said current file contains the topic id reference in the mapping file, the topic id reference is a label which is associated with a different file;

when the current file contains the topic id reference, retrieving an associated file name and an associated file path based on the topic id reference; and changing the current file to a new file indicated by the associated file name and associated file path; and evaluating the new file as the current file;

determining whether all files in the set of files have been evaluated;

when any file in the set of files has not been fully evaluated, determining which file in the set of files will become the new current file and beginning evaluation of the new current file;

when all files have been evaluated, comparing the analyzed data with links data; and based on the determinations, producing an analysis report on the computer which includes a broken-links report, a files-with-no-links report, an absolute-links report, an orphaned-files report, an incorrect-case report, and an invalid-slash report, the invalid-slash report indicating occurrences of backward slash "\" which can prevent a hypertext-link from being recognized in UNIX based file systems.

2. The method of claim 1, further comprising:

determining whether said first file contains a reference to any other file in said set of electronically stored files.

3. The method of claim 1, further comprising:
determining whether any other file in said set of electronically stored files contains a reference to said first file.

4. The method of claim 1, further comprising:
receiving said set of electronically stored files in compressed form.

5. The method of claim 1, further comprising:
decompressing said first file prior to said determining whether said first file contains an invalid symbol.

6. A computer readable storage medium storing instructions that when executed by a computer, cause the computer to perform the following operations:
receiving a set of analysis parameters, the analysis parameters including parameters for initializing and guiding the evaluation and parameters specifying integrity test options;
receiving a mapping file which includes at least one topic id reference associated with a file name and a file path;
using the received analysis parameters to identify a current file in said set of electronically stored files;
evaluating a current file using the received analysis parameters;
said evaluating comprising:
   determining whether said current file contains an invalid symbol within a reference to a second file in said set of electronically stored files;
   determining whether said current file contains a broken reference;
   determining whether said current file contains an absolute reference;
   determining whether said current file is not referenced by a link within another file, when said current file is not referenced by a link within another file, it is an orphan file;
   determining whether said current file contains the topic id reference in the mapping file, the topic id reference is a label which is associated with a different file;
   when the current file contains the topic id reference,
      retrieving an associated file name and an associated file path based on the topic id reference; and
      changing the current file to a new file indicated by the associated file name and associated file path; and
      evaluating the new file as the current file;
   determining whether all files in the set of files have been evaluated;
   when any file in the set of files has not been fully evaluated, determining which file in the set of files will become the new current file and evaluating the new current file;
   when all files have been evaluated, comparing the analyzed data with links data; and
   based on the determinations, producing an analysis report which includes a broken-links report, a files-with-no-links report, an absolute-links report, an orphaned-files report, an incorrect-case report, and an invalid-slash report, the invalid-slash report indicating occurrences of backward slash "\" which can prevent a hypertext-link from being recognized in UNIX based file systems.

7. A computer-implemented method of analyzing a set of electronically stored files, comprising:
receiving, on a computer, analysis parameters for initializing and guiding the evaluation and parameters specifying integrity test options;
receiving, on the computer, a mapping file which includes at least one topic id reference associated with a file name and a file path;
identifying, on the computer, a first file in said set of electronically stored files; and
based on the received analysis parameters,
examining, on the computer, one or more references in said set of electronically stored files, said examining comprising:
   determining whether said first file contains one or more alphabetic characters of incorrect case within a reference to a second file in said set of electronically stored files;
   determining whether said first file contains a backward slash symbol ("\") within a reference to a third file in said set of electronically stored files;
   determining whether said first file contains a reference to any other file in said set of electronically stored files;
   determining whether any file in said set of electronically stored files contains a reference to said first file;
   determining whether said first file contains an absolute reference, said absolute reference comprises a complete path to a fourth file in said set of electronically stored files;
   determining whether said first file contains an invalid path within a reference to a fifth file in said set of electronically stored files;
   determining whether said first file contains a reference to a file not present in said set of electronically stored files;
   determining whether said first file is not referenced by a link within another file, when said first file is not referenced by the link within another file, it is an orphan file;
   determining whether said first file contains the topic id reference in the mapping file, the topic id reference is a label which is associated with a different file:
   if when the file contains the topic id reference,
      retrieving an associated file name and an associated file path based on the topic id reference; and
      changing the file to a new file indicated by the associated file name and associated file path;
      examining the new file as the first file;
determining whether all files in the set of files have been examined;
when any file in the set of files has not been fully examined, determining which file in the set of files will become the new first file and examining the new first file;
when all files have been examined, comparing the analyzed data with links data; and
based on the determinations, producing an analysis report on a computer which includes a broken-links report, a files-with-no-links report, an absolute-links report, an orphaned-files report, an incorrect-case report, and an invalid-slash report, the invalid-slash report indicating occurrences of backward slash "\" which can prevent a hypertext-link from being recognized in UNIX based file systems.

8. A computer readable storage medium storing instructions that when executed by a computer, cause the computer to perform the following operations:
receiving analysis parameters for initializing and guiding the evaluation and parameters specifying integrity test options;
receiving a mapping file which includes at least one topic id reference associated with a file name and a file path;
identifying a first file in said set of electronically stored files; and
based on the received analysis parameters, examining one or more references in said set of electronically stored files, said examining comprising:
    determining whether said first file contains one or more alphabetic characters of incorrect case within a reference to a second file in said set of electronically stored files;
    determining whether said first file contains a backward slash symbol ("\") within a reference to a third file in said set of electronically stored files;
    determining whether said first file contains a reference to any other file in said set of electronically stored files;
    determining whether any file in said set of electronically stored files contains a reference to said first file;
    determining whether said first file contains an absolute reference, said absolute reference comprises a complete path to a fourth file in said set of electronically stored files;
    determining whether said first file contains an invalid path within a reference to a fifth file in said set of electronically stored files;
    determining whether said first file contains a reference to a file not present in said set of electronically stored files;
    determining whether said first file is not referenced by a link within another file, when said first file is not referenced by the link within another file, it is an orphan file;
    determining whether said first file contains the topic id reference in the mapping file, the topic id reference is a label which is associated with a different file:
    when the file contains the topic id reference,
        retrieving an associated file name and an associated file path based on the topic id reference; and
        changing the file to a new file indicated by the associated file name and associated file path;
        examining the new file as the current file;
determining whether all files in the set of files have been examined;
    when any file in the set of files has not been fully examined, determining which file in the set of files will become the new first file and examining the new first file;
    when all files have been examined, comparing the analyzed data with links data; and
    based on the determinations, producing an analysis report which includes a broken-links report, a files-with-no-links report, an absolute-links report, an orphaned-files report, an incorrect-case report, and an invalid-slash report, the invalid-slash report indicating occurrences of backward slash "\" which can prevent a hypertext-link from being recognized in UNIX based file systems.

9. A computer system for evaluating the integrity of a set of electronic files containing file references, the apparatus comprising:
    a processor;
    a memory;
    a receiving mechanism to receive analysis parameters for initializing and guiding the evaluation and parameters specifying integrity text options;
    a mapping-file-receiving mechanism to receive a mapping file, which includes at least one topic id reference associated with a file name and a file path;
    an integrity evaluator to examine each file in the set of files for the following errors, based on the received analysis parameters:
        a broken file reference;
        an invalid symbol within a file reference;
        an absolute file reference;
        a first file containing no file references identifying any other file in the set of files;
        a topic id reference which is a label associated with a different file; and
    wherein when the first file contains the topic id reference in the mapping file, the integrity evaluator:
        retrieves an associated file name and an associated file path based on the topic id reference; and
        changes the file to a file indicated by the associated file name and associated file path; and
        begins examination of the new file as the current file;
        a second file which is an orphan file and which is identified in no file reference links of the other files of the set of files,
    wherein the integrity evaluator determines whether all files in the set of files have been examined by:
        when any file in the set of files has not been fully examined, determining which file in the set of files will become the new current file and examining the new current file; and
        when all files have been examined, comparing the analyzed data with links data; and
    a reporting mechanism to issue a report on said errors which includes a broken-links report, a file-with-no-links report, an absolute-links report, an orphaned-files report, an incorrect-case report, and an invalid-slash report, the invalid-slash report indicating occurrences of backward slash "\" which can prevent a hypertext-link from being recognized in UNIX based file systems.

* * * * *

UNITED STATES PATENT AND TRADEMARK OFFICE
CERTIFICATE OF CORRECTION

| | | |
|---|---|---|
| PATENT NO. | : 7,620,887 B1 | Page 1 of 1 |
| APPLICATION NO. | : 10/121354 | |
| DATED | : November 17, 2009 | |
| INVENTOR(S) | : Jedidja Lubbers et al. | |

It is certified that error appears in the above-identified patent and that said Letters Patent is hereby corrected as shown below:

Title Page, Item (54), Title: in column 1, line 1, delete "OF" and insert -- FOR --, therefor.

Title Page, (*) Notice: Delete "577 days" and insert -- 704 days --.

In column 1, line 1, delete "OF" and insert -- FOR --, therefor.

In column 10, line 18, in claim 1, delete "file" and insert -- file, --, therefor.

In column 10, line 35, in claim 1, delete "by a" and insert -- by the --, therefor.

In column 11, line 63, in claim 7, delete "evaluation" and insert -- evaluation, --, therefor.

In column 11, line 65, in claim 7, delete "file" and insert -- file, --, therefor.

In column 12, line 19, in claim 7, after "reference," insert -- wherein --.

In column 12, line 34, in claim 7, delete "file:" and insert -- file; --, therefor.

In column 12, line 35, in claim 7, before "when" delete "if".

In column 12, line 48, in claim 7, delete "links" and insert -- link --, therefor.

Signed and Sealed this

Twenty-fourth Day of August, 2010

David J. Kappos
*Director of the United States Patent and Trademark Office*